US008824728B2

(12) United States Patent
Lee et al.

(10) Patent No.: US 8,824,728 B2
(45) Date of Patent: Sep. 2, 2014

(54) METHOD AND SYSTEM FOR TRACKING ILLEGAL DISTRIBUTOR AND PREVENTING ILLEGAL CONTENT DISTRIBUTION

(75) Inventors: Sang-Woo Lee, Daejeon (KR); Yun-Kyung Lee, Daejeon (KR); Sin Hyo Kim, Daejeon (KR); Byung Ho Chung, Daejeon (KR); Hyeran Mun, Daejeon (KR); Sokjoon Lee, Daejeon (KR); Gun Tae Bae, Daejeon (KR); Jung Yeon Hwang, Daejeon (KR); Hyun Sook Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 259 days.

(21) Appl. No.: 13/332,641

(22) Filed: Dec. 21, 2011

(65) Prior Publication Data

US 2012/0163654 A1 Jun. 28, 2012

(30) Foreign Application Priority Data

Dec. 22, 2010 (KR) ........................ 10-2010-0132072

(51) Int. Cl.
*G06K 9/00* (2006.01)
*H04N 21/2743* (2011.01)
(Continued)

(52) U.S. Cl.
CPC ......... *H04L 9/3226* (2013.01); *H04L 2209/608* (2013.01); *H04N 21/2743* (2013.01); *H04N 21/42684* (2013.01); *H04N 19/00557* (2013.01); *H04N 21/2541* (2013.01); *H04N 21/8358* (2013.01); *H04N 21/8352* (2013.01); *H04L 2209/606* (2013.01); *H04N 21/242* (2013.01); *G06T 1/0021* (2013.01); *H04N 21/25866* (2013.01); *H04N 21/23418* (2013.01); *H04N 21/2383* (2013.01); *H04N 21/6582* (2013.01)

USPC ............... 382/100; 713/176; 705/59; 726/26; 726/27; 726/28; 726/29; 726/30

(58) Field of Classification Search
USPC ....... 382/100; 726/26–32; 713/176; 707/769; 705/59; 709/219
See application file for complete search history.

(56) References Cited

U.S. PATENT DOCUMENTS 6,920,567 B1 * 7/2005 Doherty et al. ................. 726/22
7,047,412 B2 * 5/2006 Echizen et al. ............... 713/176

(Continued)

FOREIGN PATENT DOCUMENTS

JP 2000020600 A * 1/2000 .............. G06F 17/60
KR 1020060032886 A 4/2006

(Continued)

OTHER PUBLICATIONS

Boneh, Collusion secure fingerprinting for digital data, Sep. 1998, IEEE transactions on information theory, vol. 44 No. 5.*

*Primary Examiner* — Jayesh A Patel
*Assistant Examiner* — Iman K Kholdebarin
(74) *Attorney, Agent, or Firm* — William Park & Associates Ltd.

(57) ABSTRACT

A system for tracking an illegal distributor and preventing an illegal content distribution includes: a forensic mark generator for receiving content and a content identification code from a content providing apparatus to generate a forensic mark; a forensic mark database for storing the generated forensic mark; a forensic mark insertion unit for inserting the forensic mark into the content; and a content database for storing the content into which the forensic mark has been inserted. The system further includes a content transmitter for transmitting the content into which the forensic mark has been inserted to the content utilization apparatus.

16 Claims, 6 Drawing Sheets (51) Int. Cl.
*H04N 21/426* (2011.01)
*H04N 7/26* (2006.01)
*H04N 21/254* (2011.01)
*H04N 21/8358* (2011.01)
*H04L 9/32* (2006.01)
*H04N 21/8352* (2011.01)
*H04N 21/242* (2011.01)
*G06T 1/00* (2006.01)
*H04N 21/258* (2011.01)
*H04N 21/234* (2011.01)
*H04N 21/2383* (2011.01)
*H04N 21/658* (2011.01)

(56) References Cited

U.S. PATENT DOCUMENTS

| | | | |
|---|---|---|---|
| 7,269,577 B2 * | 9/2007 | Stefik et al. | 705/59 |
| 7,292,708 B2 * | 11/2007 | Lee et al. | 382/100 |
| 7,343,025 B2 * | 3/2008 | Seo et al. | 382/100 |
| 7,644,282 B2 * | 1/2010 | Petrovic et al. | 713/176 |
| 2001/0037465 A1 * | 11/2001 | Hart et al. | 713/201 |
| 2002/0007403 A1 * | 1/2002 | Echizen et al. | 709/217 |
| 2002/0166056 A1 * | 11/2002 | Johnson et al. | 713/193 |
| 2004/0088549 A1 * | 5/2004 | Ukai et al. | 713/175 |
| 2004/0093273 A1 * | 5/2004 | Laurent et al. | 705/26 |
| 2004/0215570 A1 * | 10/2004 | Uemura et al. | 705/59 |
| 2005/0154892 A1 * | 7/2005 | Mihcak et al. | 713/176 |
| 2006/0120562 A1 * | 6/2006 | Fudge et al. | 382/100 |
| 2006/0130148 A1 * | 6/2006 | Kim et al. | 726/26 |
| 2007/0294173 A1 * | 12/2007 | Levy et al. | 705/51 |
| 2008/0097921 A1 * | 4/2008 | Kim et al. | 705/53 |
| 2008/0226124 A1 * | 9/2008 | Seo et al. | 382/100 |
| 2008/0256647 A1 * | 10/2008 | Kim et al. | 726/32 |
| 2008/0301456 A1 * | 12/2008 | Staring et al. | 713/176 |
| 2009/0125310 A1 * | 5/2009 | Lee et al. | 704/273 |
| 2009/0172404 A1 * | 7/2009 | Kim et al. | 713/176 |
| 2010/0063978 A1 * | 3/2010 | Lee et al. | 707/769 |
| 2010/0174608 A1 * | 7/2010 | Harkness et al. | 705/14.53 |
| 2011/0182466 A1 * | 7/2011 | Lin et al. | 382/100 |
| 2012/0163654 A1 * | 6/2012 | Lee et al. | 382/100 |

FOREIGN PATENT DOCUMENTS

| | | | |
|---|---|---|---|
| KR | 1020060057920 A | | 5/2006 |
| KR | 1020090104349 A | | 10/2009 |
| KR | 1020100050731 A | | 5/2010 |
| WO | WO 2007148883 A1 * | 12/2007 | |
| WO | WO 2008066235 A1 * | 6/2008 | G06T 1/00 |

* cited by examiner

METHOD AND SYSTEM FOR TRACKING ILLEGAL DISTRIBUTOR AND PREVENTING ILLEGAL CONTENT DISTRIBUTION

CROSS-REFERENCE(S) TO RELATED APPLICATION(S)

The present invention claims priority of Korean Patent Application No. 10-2010-0132072, filed on Dec. 22, 2010, which is incorporated herein by reference.

FIELD OF THE INVENTION

The present invention relates to a copy right protection technology of multimedia contents, and more particularly, to a method and system for preventing an illegal content distribution and tracking an illegal distributor using a forensic mark inserting technology.

BACKGROUND OF THE INVENTION

In general, a technology of a digital rights management (DRM) is used to protect a copy right of digital content. In an environment of the DRM described above, the content is encrypted and a key used to encrypt the content is managed by a license, so that only a legal user can decode and use the content. However, the encryption technology based a DRM technology has a limitation in that it cannot counteract an illegal distribution of decoded content or the like.

To compensate this, a study to track illegal distributors of the content by using a watermarking technique is being actively progressed.

The watermarking technique and forensic marking technique that are representative technologies to protect a copy right of multimedia content may be regarded as the same technology in terms of the method to insert or extract signals that cannot be recognized by a user into or from the content. In practice, the forensic mark is inserted and extracted by using insertion and extraction methods that are used in the existing watermarking method so that a purchaser cannot perceive it. However, there is a difference in that information inserted is different from one another between the watermarking technique and the forensic marking technique. It is because the aim is to track information on a legal purchaser from illegally distributed content by inserting copy right information of content in the watermarking technique and inserting purchaser information to purchase the content in the forensic marking technique.

Meanwhile, since different purchaser information is inserted in the forensic marking technique, the same content has different information inserted thereinto. A malicious purchaser may try to remove the inserted forensic mark using the difference from each content, which is referred to a collusion attack. Thus, an anti-collusion code that can counteract the collusion attack is being actively studied when generating the forensic mark.

In the conventional forensic marking technique that operates as described above, since it is utilized to track an illegal distributor for later use, there is a problem that it is not possible to prevent the illegal content from being distributed in advance.

Further, since the existing anti-collusion code is used without systemizing the total number of users and the number of detectable ones in collusion to a specific unit, the anti-collusion code becomes long in length in proportion to the total number of users and the number of detectable ones in collusion.

Also, although the forensic mark inserting and detecting technique uses a masking method to which a human visual system (HVS) or the like is applied in order to guarantee strength against various content transformations, it has a problem that a forensic mark inserting and detecting speed is decreased.

SUMMARY OF THE INVENTION

In view of the above, the present invention provides a method and system for preventing an illegal content distribution and tracking an illegal distributor, which are capable of inserting and detecting a forensic mark into and from a high-resolution video in real time while having strength against geometrical transformation, filtering transformation, compression format change or the like in forensic marked content.

Further, the preset invention provides a method and system for preventing an illegal content distribution and tracking an illegal distributor, which are capable of confirming whether or not there is illegality, blocking an illegal content distribution, and tracking an illegal distributor at the point of time when the illegal content is uploaded in a web hard or the like.

Furthermore, the present invention provides a method and system for preventing an illegal content distribution and tracking an illegal distributor, which are capable of providing an anti-collusion code that is shorter in length than the conventional anti-collusion code, by separately configuring the forensic mark for a distributor and a user.

In accordance with an aspect of the present invention, there is provided a system for tracking an illegal distributor and preventing an illegal content distribution including: a forensic mark generator for receiving content and a content identification code from a content providing apparatus to generate a forensic mark; a forensic mark database for storing the generated forensic mark and storing content transaction information when requested to transmit the content information by a content utilization apparatus afterward; a forensic mark insertion unit for inserting the forensic mark into the content; a content database for storing the content into which the forensic mark has been inserted; and a content transmitter for transmitting the content into which the forensic mark has been inserted to the content utilization apparatus.

In accordance with another aspect of the present invention, there is provided a method for tracking an illegal distributor and preventing an illegal content distribution including: receiving content and a content identification code from a content providing apparatus to generate a forensic mark; storing the generated forensic mark in a forensic mark database; inserting the forensic mark into the content; storing the content into which the forensic mark has been inserted in a content database; storing content transaction information in the forensic mark database when requested to transmit the content by a content utilization apparatus afterward; and transmitting the content into which the forensic mark has been inserted to the content utilization apparatus.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Embodiments of the present invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

In the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms should be defined throughout the description of the present invention.

Combinations of respective blocks of block diagrams attached herein and respective steps of a sequence diagram attached herein may be carried out by computer program instructions. Since the computer program instructions may be loaded in processors of a general purpose computer, a special purpose computer, or other programmable data processing apparatus, the instructions, carried out by the processor of the computer or other programmable data processing apparatus, create devices for performing functions described in the respective blocks of the block diagrams or in the respective steps of the sequence diagram. Since the computer program instructions, in order to implement functions in specific manner, may be stored in a memory useable or readable by a computer aiming for a computer or other programmable data processing apparatus, the instruction stored in the memory useable or readable by a computer may produce manufacturing items including an instruction device for performing functions described in the respective blocks of the block diagrams and in the respective steps of the sequence diagram. Since the computer program instructions may be loaded in a computer or other programmable data processing apparatus, instructions, a series of processing steps of which is executed in a computer or other programmable data processing apparatus to create processes executed by a computer so as to operate a computer or other programmable data processing apparatus, may provide steps for executing functions described in the respective blocks of the block diagrams and the respective steps of the sequence diagram.

Moreover, the respective blocks or the respective steps may indicate modules, segments, or some of codes including at least one executable instruction for executing a specific logical function(s). In several alternative embodiments, it is noticed that functions described in the blocks or the steps may run out of order. For example, two successive blocks and steps may be substantially executed simultaneously or often in reverse order according to corresponding functions.

An embodiment of the present invention is directed to insert and detect a high-resolution video in real time while having strength against geometrical transformation, filtering transformation, compression format change or the like in forensic marked content, confirm whether or not there is illegality, block an illegal content distribution, and track an illegal distributor at the point of time when the illegal content is uploaded in a web hard or the like. Also, the embodiment of the present invention is directed to provide an anti-collusion code that is shorter in length than the conventional anti-collusion code, by separately configuring the forensic mark for a distributor and a user.

A video watermarking technique requires strength, non-visibility and real-time characteristics. The strength means a property that a watermark can be normally detected from a watermarked video even when various video transformations are made in the watermarked video, the non-visibility means a property that the watermarked video is not visible to human eyes so that it does not deteriorate the quality of an original video, and the real-time characteristics mean a property that it is necessary to insert and detect the watermark at a high speed without affecting the video reproduction speed.

Such requirements have a property that when one function is emphasized, other functions are weakened. That is, when weakening the strength of the watermark in order to increase the non-visibility, it resultantly reduces the strength. Thus, it is needed to provide a scheme for inserting and detecting the watermark while suitably satisfying the foregoing requirements.

Hereinafter, embodiments of the present invention will be described in detail with reference to the accompanying drawings.

Figure 1:
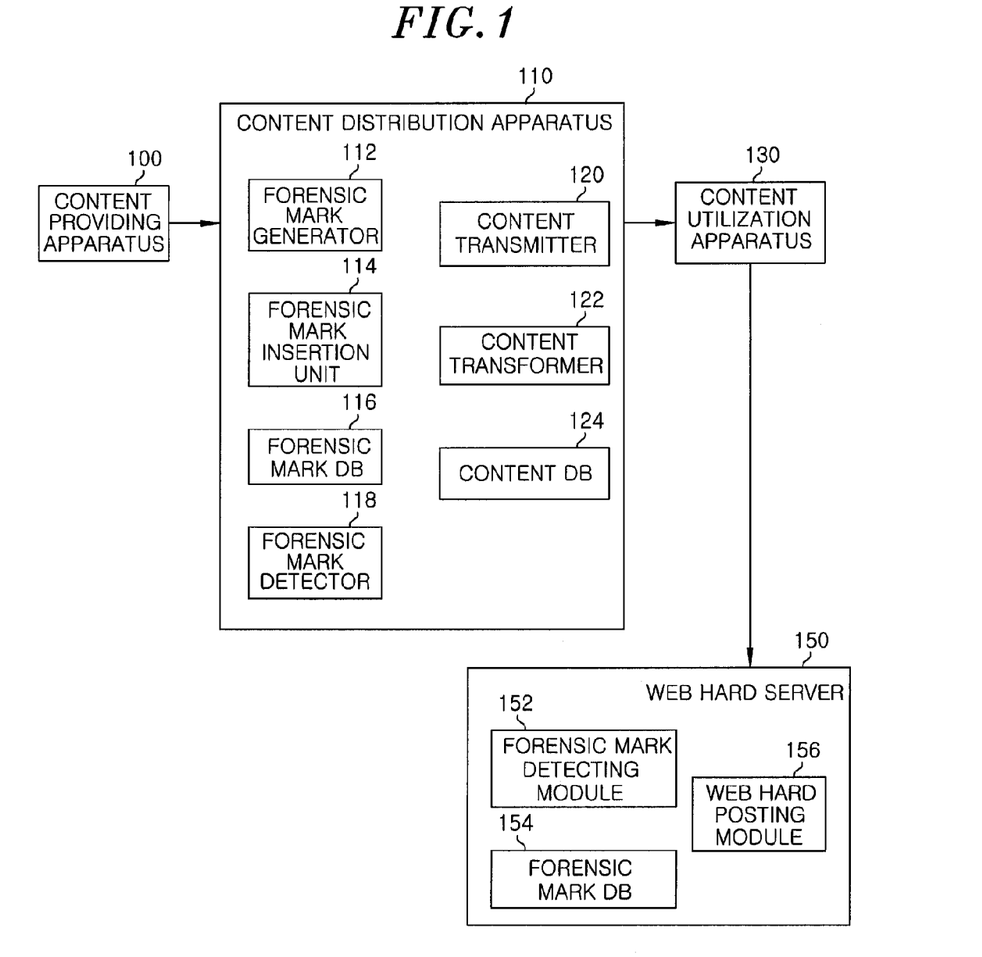
FIG. 1 is a block diagram illustrating a system for preventing an illegal content distribution and tracking an illegal distributor in accordance with an embodiment of the present invention.

FIG. 1 is a block diagram illustrating the configuration of a system for preventing an illegal content distribution and tracking an illegal distributor in accordance with an embodiment of the present invention.

Referring to FIG. 1, the system for preventing an illegal content distribution and tracking an illegal distributor includes a content providing apparatus 100, a content distribution apparatus 110, a content utilization apparatus 130, a web hard server 150 and the like.

More specifically, the content providing apparatus 100 stores multiple contents and transfer the stored contents to the content distribution apparatus 110.

The content distribution apparatus 110 may include a forensic mark generator 112 for generating a forensic mark, a forensic mark insertion unit 114 for inserting the generated forensic mark into content, a forensic mark DB 116 for storing the forensic mark, a forensic mark detector 118 for tracking an illegal distributor afterward and the like, a content transmitter 120 for transmitting the forensic marked content to the content utilization apparatus 130, a content transformer 122 for transforming the forensic marked content to match display methods of various user devices (e.g., screen size, reproduction decoding method and the like) and a content DB 124 for storing forensic marked content.

The content utilization apparatus 130 performs a content request to the content providing apparatus 100 in response to a user's command, uploads and downloads contents to and from the web hard server 150, which may be a computing device including a computer, a PMP, a mobile communication terminal and the like.

The web hard server 150 includes a forensic mark detection module 152 for detecting a forensic mark in the content, a forensic mark DB 154 in which the forensic mark including copy right information is stored, a web hard posting module 156 for posting content in response to posting request information from the content utilization apparatus 130 and the like. Such a web hard server 150 detects a content identification code transmitted from the content utilization apparatus 130 to determine whether a copy right of the content is protected. When the content has a copy right to be protected, the web hard server 150 can block the upload of the content, and then detect a distributor identification code and transmit the illegal content to the content distribution apparatus 110.

Figure 2:
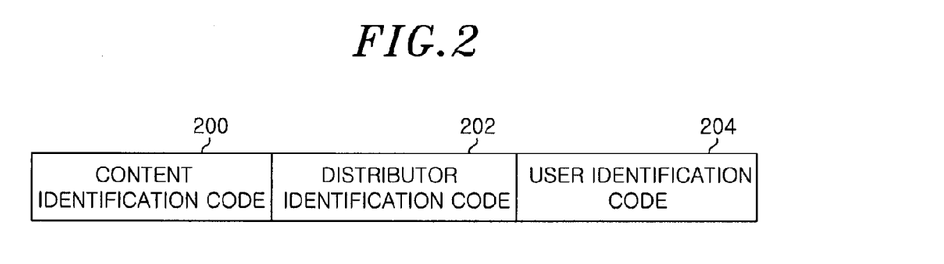
FIG. 2 is a view illustrating a configuration of a forensic mark in accordance with the embodiment of the present invention.

FIG. 2 is a view illustrating a configuration of a forensic mark in accordance with the embodiment of the present invention.

Referring to FIG. 2, a content identification code 200 is a unique value that can be identified uniquely for each content, which is a value provided together with the content to the content distribution apparatus 110 by the content providing apparatus 100. A distributor identification code 202 is a value uniquely allocated to each specific distributor, and a user identification code 204 is a value uniquely allocated to each user.

The content identification code 200 is a value that can be used to detect the forensic mark of the content that is uploaded in the forensic mark detection module 152 mounted in the web hard server 150 to determine whether the content is illegal or not. When it is determined to be illegal, block a prior distribution of the illegal content. The distributor identification code 202 and the user identification code 204 are values that can be used to track an illegal distributor when the content is illegally distributed.

Figure 3:
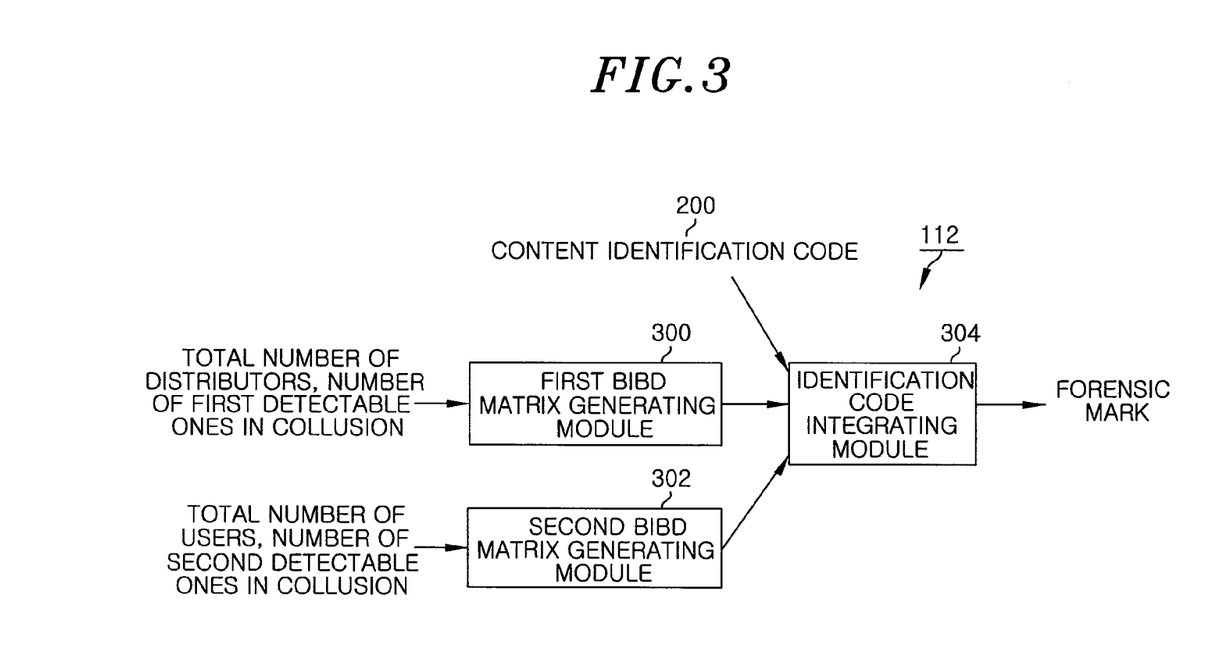
FIG. 3 is detailed diagram illustrating a configuration of a forensic mark generator in a content distribution apparatus in accordance with the embodiment of the present invention.

FIG. 3 is a detailed block diagram illustrating the configuration of the forensic mark generator 112 in the content distribution apparatus in accordance with the embodiment of the present invention.

Referring to FIG. 3, the forensic mark generator 112 includes a first balanced incomplete block design (BIBD) matrix generation module 300 for receiving the total number of distributors and the number of first detectable ones in collusion to generate a distributor identification code, a second BIBD matrix generation module 302 for receiving the total number of users and the number of second detectable ones in collusion to generate a user identification code, an identification code integration module 304 for connecting the content identification code 200 transmitted from the content providing apparatus 100 together with the content, the distributor identification code 202, and the user identification code 204 adjacently to each other to generate a final forensic mark.

As such, the embodiments of the present invention have an effect that a specific distributor is first detected when tracking an illegal reproduction later by separating the distributor identification code and the user identification code from each other and a privacy of a legal user is strengthened by enabling the distributor to track the user. Further, it is possible to reduce the length of the forensic mark generated by specifying possible users for collusion on a basis of specific distributors.

Figure 4:
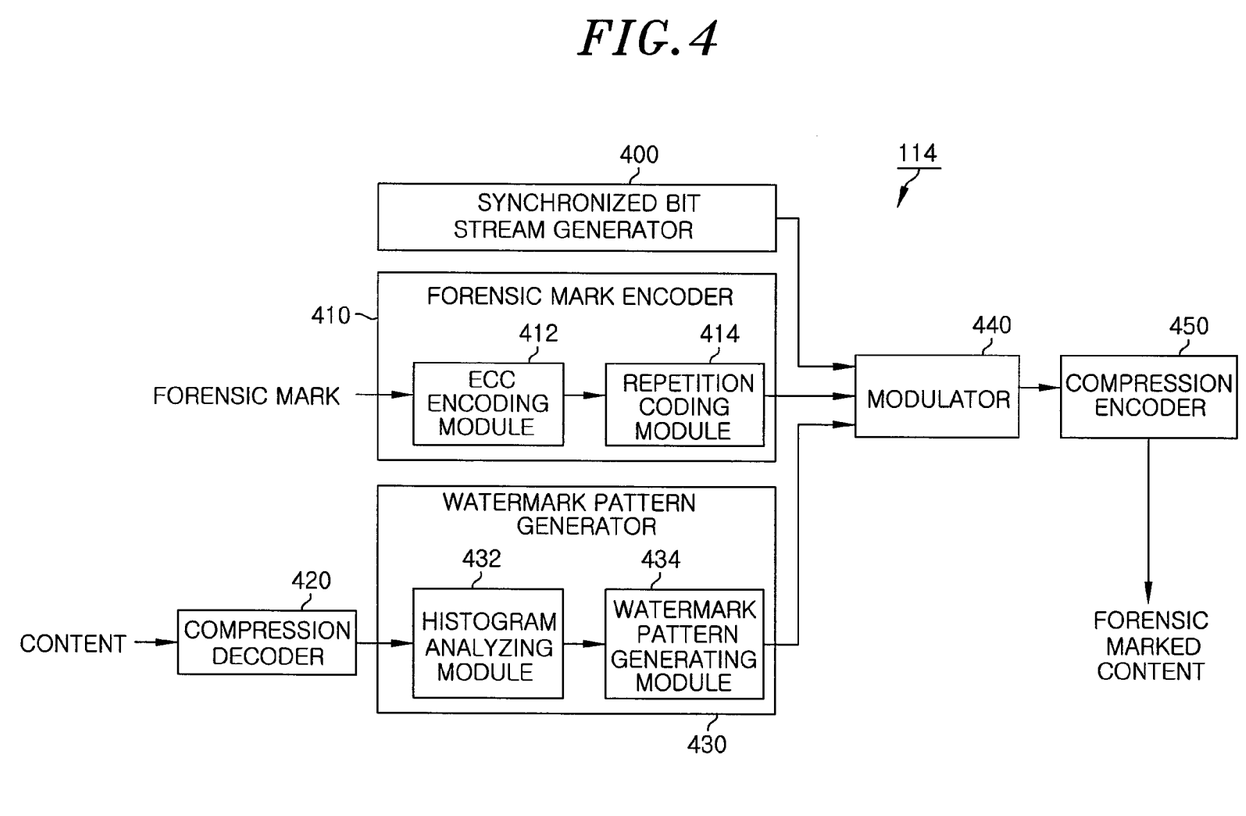
FIG. 4 is a detailed block diagram illustrating a forensic mark insertion unit in the content distribution apparatus in accordance with an embodiment of the present invention.

FIG. 4 is a detailed block diagram illustrating the configuration of the forensic mark insertion unit in the content distribution apparatus in accordance with the embodiment of the present invention.

Referring to FIG. 4, the forensic mark insertion unit 114 includes a synchronized bit stream generator 400, a forensic mark encoder 410, a compression decoder 420, a watermark pattern generator 430, a modulator 440, a compression encoder 450, and the like.

More specifically, the forensic mark encoder 410 includes an error correcting code (ECC) encoding module 412, a repetition coding module 414 and the like. The ECC encoding module 412 performs ECC-encoding the received forensic mark. Further, the repetition coding module 414 repeatedly encodes the ECC-encoded forensic mark message and transfers it to the modulator 440. The synchronized bit stream generator 400 generates a synchronized bit stream to specify a position of a start frame into which the forensic mark message is inserted.

The compression decoder 420 decompresses the original content and transfers the decompressed content image to the watermark pattern generator 430. The watermark pattern generator 430 includes a histogram analysis module 432, a watermark pattern generating module 434 and the like. The watermark pattern generator 430 analyzes a histogram of the decompressed content image through the histogram analysis module 432 and generates a watermark pattern by using the histogram analysis result through the watermark pattern generating module 434. Also, it may transfer the generated watermark pattern to the modulator 440.

The modulator 440 inserts the encoded message transferred from the repetition coding module 414 into a chrominance component frame of the content by comparing adjacent two frames in magnitude depending on the watermark pattern to generate a modulated content, and the compression encoder 450 compresses the modulated content based on a compression format of the content.

Meanwhile, a watermark pattern generation step in the watermark pattern generator 430 generates a watermark pattern value on the basis of the following Eq. 1:

$$W(x,y) = +\alpha \text{ if } Y(x,y) \geq Y_{mean}(x,y) + (Y_{mean}(x,y) \times \beta) - \alpha \text{ if } Y(x,y) < Y_{mean}(x,y) - (Y_{mean}(x,y) \times \beta) 0 \text{ else}$$   Eq. 1

In Eq. 1, $W(x,y)$ denotes a watermark pattern value that a pixel corresponding to $(x,y)$ has, $\alpha$ is a watermark pattern value that is applied in consideration of just noticeable difference (JND), and $\beta$ is an algorithm parameter that affects the number of pixels that are to be transformed through the watermark pattern in a current frame.

Herein, when $\beta$ is 0.25, a pixel having a value 0.25 times greater than an average value specifies $\alpha$, and a pixel having a value 0.25 times less than the average value specifies $-\alpha$. Further, when the corresponding pixel has a value between (average−0.25*average) and (average+0.25*average), it specifies 0.

That is, $\beta$ is an algorithm parameter to determine a tradeoff between non-visibility and strength of the watermark algorithm. The watermark pattern generated in the foregoing method is composed of $-\alpha$, $+\alpha$, and 0 and may be generated in a matrix having the same resolution as the original video resolution.

The modulator 440 modulates the content by using the following Eq. 2:

$$Cb'(x, y) = Cb_i(x, y) - m \times W_i(x, y) \text{ if } \left(i \leq \frac{K}{2}\right)$$
$$Cb_i(x, y) + m \times W_i(x, y) \text{ if } \left(i > \frac{K}{2}\right)$$
Eq. 2

In Eq. 2, Cb' denotes a value of modulated Cb, Cb denotes a value of an original video Cb, m denotes an encoded message, Wi denotes an ith watermark pattern, and K denotes the number of continuous frames.

If m is 1 when K is 4, the watermark pattern is subtracted from a current Cb value in the first and second frames (i.e., i==1 or 2), and the watermark pattern is added to the current Cb value in the third and fourth frames (i.e., i==3 or 4). When m is −1, the above process is performed in reverse.

Figure 5:
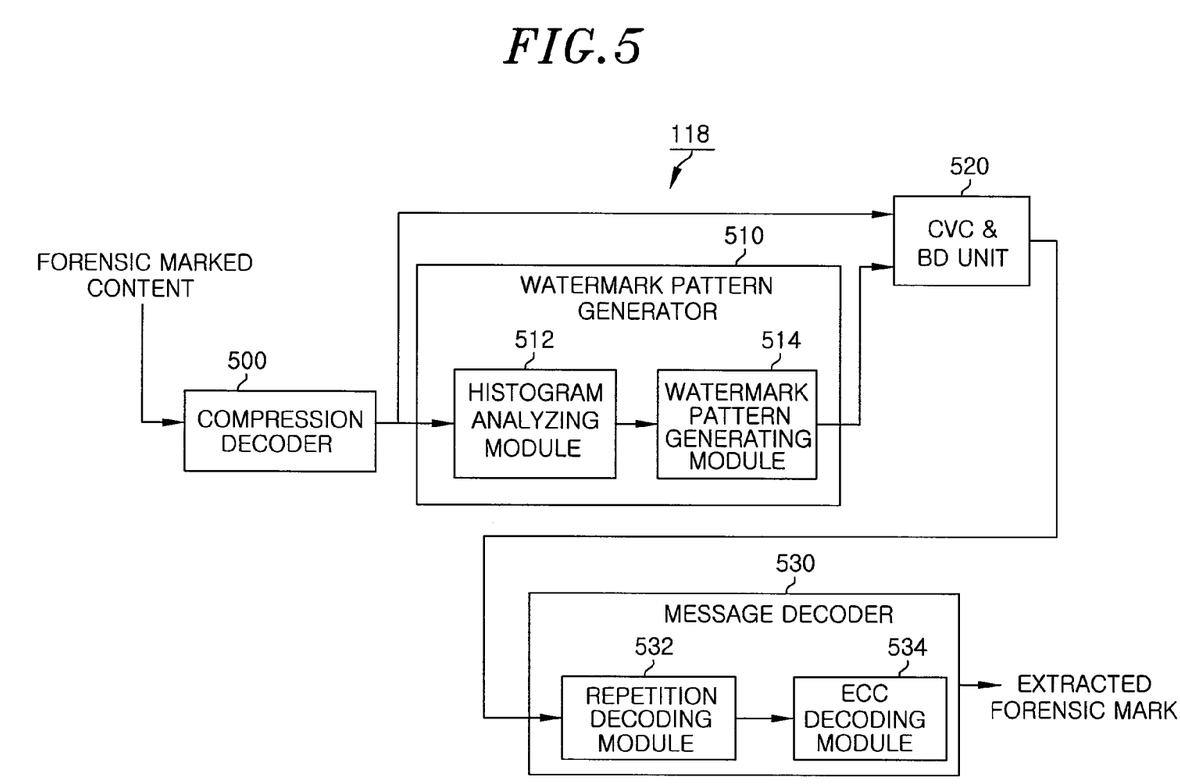
FIG. 5 is a detailed block diagram illustrating a forensic mark detecting unit in the content distribution apparatus in accordance with an embodiment of the present invention.

FIG. 5 is a detailed block diagram illustrating the configuration of the forensic mark detector in the content distribution apparatus in accordance with the embodiment of the present invention.

Referring to FIG. 5, the forensic mark detector 118 detects a forensic mark from the illegal content transmitted from the web hard server 150 to identify an illegal distributor. The forensic mark detector includes a compression decoder 500, a watermark pattern generator 510, a correlation value calculation and bit determination (CVC & BD) unit 520, a message decoder 530 and the like.

The compression decoder 500 decompresses the content received from the web hard server 150 and transfers the decompressed content to the watermark pattern generator 510. The watermark pattern generator 510 includes a histogram analysis module 512 and a watermark pattern generating module 514. The histogram analysis module 512 analyses a histogram of an image of the content decompressed through the compression decoder 500 and transfers the analysis result to the watermark pattern generating module 514.

The watermark pattern generating module 514 generates a watermark pattern by using the transferred analysis result. The correlation value calculating and bit determining unit 520 calculates a correlation value between the watermark pattern and a Cb frame on the basis of the generated watermark pattern and the content image decompressed through the compression decoder 500, and determines inserted watermark bit information by comparing the correlation values in magnitude.

The message decoder 530 includes a repetition decoding module 532 and an ECC decoding module 534. The repetition decoding module 532 repeatedly decodes the message bit obtained from the correlation value calculating and bit determining unit 520 and the ECC decoding module 534 performs ECC decoding on the repeatedly decoded message to extract a forensic mark.

It is possible to confirm an identity of an illegal distributor through the extracted forensic mark as described above.

Figure 6:
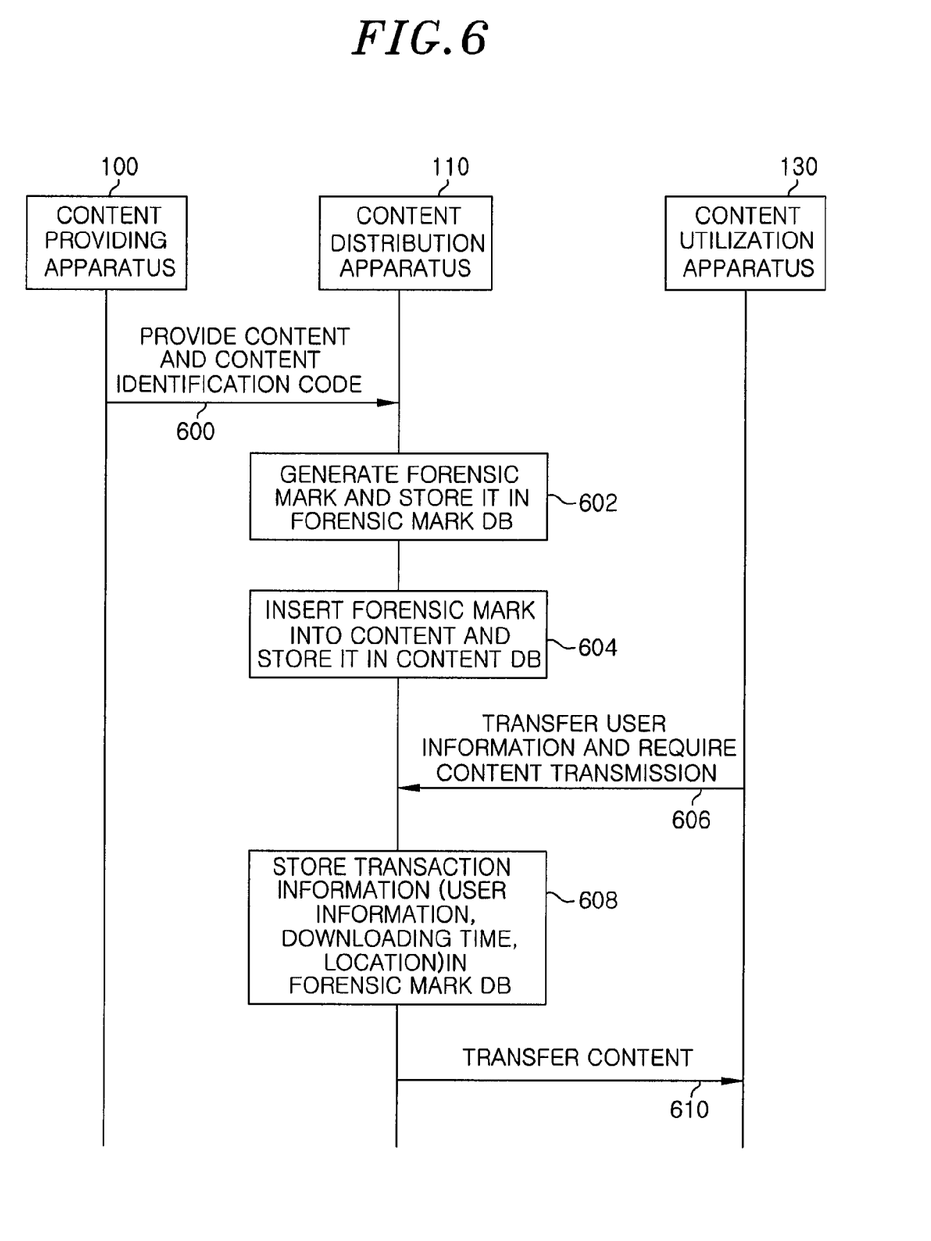
FIG. 6 is a flowchart illustrating a forensic mark inserting and content transmitting process in a system for preventing an illegal content distribution and tracking an illegal distributor in accordance with an embodiment of the present invention.

FIG. 6 is a flowchart illustrating a forensic mark insertion and content transmission process in the system for preventing an illegal content distribution and tracking an illegal distributor in accordance with the embodiment of the present invention.

Referring to FIG. 6, in step 600, the content providing apparatus 100 provides the content distribution apparatus 110 with content and a content identification code of the corresponding content. Then, the content distribution apparatus 110 generates a distributor identification code and a user identification code through the forensic mark generator 112, connects the generated codes and the content identification code adjacently to each other to generate a forensic mark, and stores the generated forensic mark in the forensic mark DB 116 in step 602.

Next, in step 604, the forensic mark insertion unit 114 inserts the forensic mark into the content and stores the content having the forensic mark therein in the content DB 124.

Thereafter, the content utilization apparatus 130 selects content to be downloaded, together with user information such as, e.g., a user authentication number, a device number or the like), through the content distribution apparatus 110 and requires the content distribution apparatus 110 to transmit the content in step 606.

Then, in step 608, the content distribution apparatus 110 stores transaction information on the content (e.g., user information, downloading time, location information where downloading is performed or the like) in the forensic mark DB 116 in which the forensic mark inserted into the content to be transmitted is stored.

The corresponding content having the forensic mark inserted thereinto is then transferred to the content utilization apparatus 130 in step 610.

Figure 7:
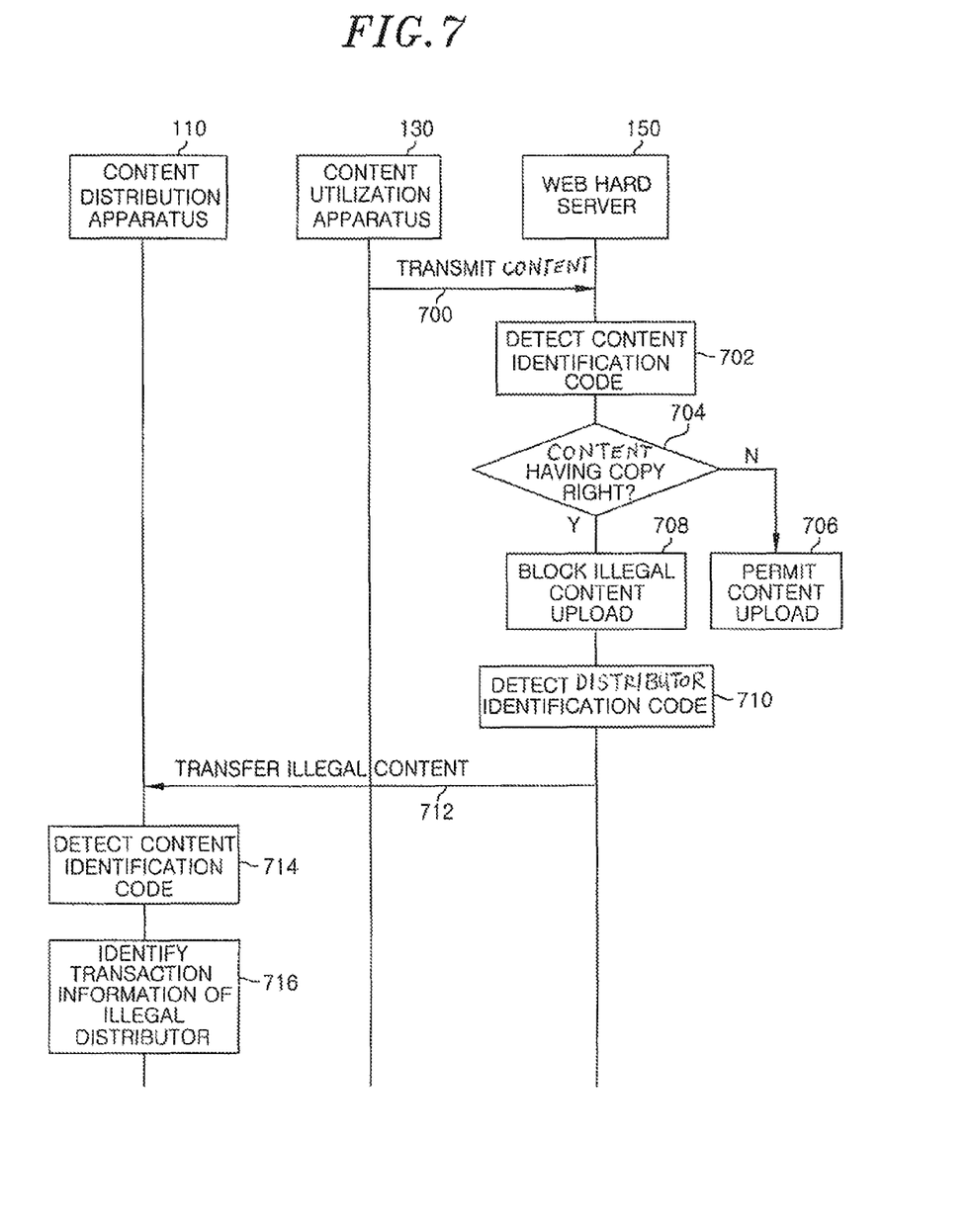
FIG. 7 is a flowchart illustrating processes of blocking illegal content distribution and detecting illegal distributor in the system for preventing an illegal content distribution and tracking an illegal distributor in accordance with an embodiment of the present invention.

FIG. 7 is a flowchart illustrating processes of blocking illegal content distribution and detecting illegal distributor in the system for preventing an illegal content distribution and tracking an illegal distributor in accordance with the embodiment of the present invention.

Referring to FIG. 7, in step 700, a user of the content utilization apparatus 130 accesses the web hard server 150 to transmit content to a bulletin of a web hard company and request content uploading. The web hard server 150 having received the content from the content utilization apparatus 130 detects a content identification code of the forensic mark through the forensic mark detecting module 152 in step 702.

Then, in step 704, it is determined whether the detected content identification code corresponds to content having a copy right with reference to the forensic mark DB 154, and when the content has no copy right or are permitted to distribute, the process proceeds to step 706 in which the web hard posting module 156 uploads the content to the bulletin.

However, when it is determined that the content has a copy right in step 704, the process proceeds to step 708, in which uploading of the content is blocked, and the forensic mark of the content is detected to identify a distributor identification code in step 710.

Subsequently, when the distributor identification code is identified, an illegal content is transmitted to the content distribution apparatus 110 corresponding to the distributor identification code in step 712.

Then, the content distribution apparatus 110 detects a user identification code from the forensic mark of the content in step 714, and then searches the forensic mark DB 116 using the detected user identification code to identify illegal distributor information in step 716.

As described above, in the system and method for tracking an illegal distributor and preventing an illegal content distribution in accordance with the embodiment of the present invention, one or more effects can be obtained as follows.

In accordance with the system and method for tracking an illegal distributor and preventing an illegal content distribution in accordance with the embodiment of the present invention, illegal content can be detected by the web hard server on which the forensic mark detecting module is mounted by using the content identification information as information on a forensic mark, and an upload can be prevented for the detected illegal content, thereby blocking the distribution of the illegal content.

In addition, it is possible to provide an anti-collusion code that is shorter in length than the general anti-collusion code by separately configuring the forensic mark for a distributor and a user.

Further, it is possible to protect a privacy of a user and to solve the problem that user information is leaked from the existing third forensic mark detecting server by enabling only a specific distributor to identify user identification information based on the detected distributor code.

Also, there is a merit that a watermark pattern is generated by analyzing a histogram of the content and a modulation method on the time axis where an average chrominance value of adjacent two frames is changed in response to a forensic mark message is performed so that a video watermarking method which has a strength against attacks such as geometric transformation, filtering transformation, codec change and the like can be provided.

Furthermore, there are effects that the watermark detection can be achieved more precisely for the video in which brightness is severely changed by using an error correction code and it is possible to insert and detect the watermark at a high speed since existing HVS based masking is not used in the forensic mark insertion and detection method.

While the invention has been shown and described with respect to the particular embodiments, it will be understood by those skilled in the art that various changes and modification may be made without departing from the scope of the invention as defined in the following claims.

What is claimed is:

1. A system for tracking an illegal distributor and preventing an illegal content distribution, the system comprising:
    a forensic mark generator configured to receive content and a content identification code from a content providing apparatus to generate a forensic mark by combining the content identification code, a distributor identification code, and a user identification code, wherein the forensic mark generator includes:
        a first balanced incomplete block design (BIBD) matrix generation module configured to receive a total number of distributors and a number of first detectable ones in collusion to generate the distributor identification code;
        a second BIBD matrix generation module configured to receive a total number of users and a number of second detectable ones in collusion to generate the user identification code;
    a forensic mark database configured to store the generated forensic mark and store content transaction information when requested to transmit the content information by a content utilization apparatus afterward;
    a forensic mark insertion unit configured to insert the forensic mark into the content;
    a content database configured to store the content into which the forensic mark has been inserted; and
    a content transmitter configured to transmit the content into which the forensic mark has been inserted to the content utilization apparatus.

2. The system of claim 1, wherein the forensic mark database stores content transaction information generated based on user information including a user authentication number or a device number transmitted from a content distribution apparatus.

3. The system of claim 2, wherein the content transaction information includes at least one of the user information, a downloading time and location information.

4. The system of claim 1, wherein the forensic mark generator includes an identification code integrating module configured to connect the content identification code, the generated distributor identification code, and the user identification code adjacently to each other to generate a forensic mark.

5. The system of claim 1, wherein the forensic mark insertion unit includes:
    a synchronized bit stream generator configured to generate a synchronized bit stream to specify a position of an insertion start frame of the forensic mark;
    a forensic mark encoder configured to perform error correction code (ECC) encoding on the forensic mark and repeatedly encoding an ECC encoded forensic mark;
    a compression decoder configured to decompress the input content;
    a watermark pattern generator configured to analyze a histogram of an image of the decompressed content and generating a watermark pattern by using the analysis result;
    a modulator configured to modulate the content by inserting the repeatedly encoded forensic mark into a chrominance component frame of the content based on the synchronized bit stream and the watermark pattern; and
    a compression encoder configured to compress the modulated content to generate forensic marked content.

6. The system of claim 1, wherein a web hard server detects the content identification code to determine the forensic marked content as forensic marked illegal content and transmits the illegal content to the system by detecting a distributor identification code, and wherein the system further comprises a forensic mark detector configured to receive the illegal content and search the forensic mark database for the content identification code to identify the content transaction information.

7. The system of claim 6, wherein the forensic mark detector includes:
    a compression decoder configured to receive and decompress the forensic marked illegal content;
    a watermark pattern generator configured to analyzing a histogram of an image of the decompressed content and generating a watermark pattern by using the analysis result;
    a correlation value calculating and bit determining unit configured to receive the decompressed content and the watermark pattern, and calculating a correlation value and determining watermark bit information; and
    a message decoder configured to repeatedly decode a message bit output from the correlation value calculating and bit determining unit and perform ECC decoding on the repeatedly decoded message bit to extract a forensic mark.

8. The system of claim 1, further comprising a content transformer configured to transform the content to match a display method of the content utilization apparatus.

9. A method for tracking an illegal distributor and preventing an illegal content distribution, the method comprising:
    receiving content and a content identification code from a content providing apparatus;
    receiving a total number of distributors and a number of first detectable ones in collusion to generate a distributor identification code;
    receiving a total number of users and a number of second detectable ones in collusion to generate a user identification code;

generating a forensic mark by combining the content identification code, the distributor identification code, and the user identification code;
storing the generated forensic mark in a forensic mark database;
inserting the forensic mark into the content;
storing the content into which the forensic mark has been inserted in a content database;
storing content transaction information in the forensic mark database when requested to transmit the content by a content utilization apparatus afterward; and
transmitting the content into which the forensic mark has been inserted to the content utilization apparatus.

10. The method of claim 9, wherein the forensic mark database stores content transaction information generated based on user information including a user authentication number or a device number transmitted from a content distribution apparatus.

11. The method of claim 10, wherein the content transaction information includes at least one of the user information, a downloading time and location information.

12. The method of claim 9, further comprising connecting the content identification code, the generated distributor identification code, and the user identification code adjacently to each other to generate a forensic mark.

13. The method of claim 9, wherein the inserting includes:
generating a synchronized bit stream to specify a position of an insertion start frame of the forensic mark;
performing error correction code (ECC) encoding on the forensic mark and repeatedly encoding an ECC encoded forensic mark;
decompressing the received content;
analyzing a histogram of an image of the decompressed content and generating a watermark pattern by using the analysis result;
modulating the content by inserting the repeatedly encoded forensic mark into a chrominance component frame of the content based on the synchronized bit stream and the watermark pattern; and
compressing the modulated content to generate forensic marked content.

14. The method of claim 9, further comprising: detecting, at a web hard server, the content identification code to determine the forensic marked content as forensic marked illegal content and detecting a distributor identification code corresponding to the illegal content, and searching the forensic mark database for the content identification code to identify the content transaction information.

15. The method of claim 14, wherein the searching includes:
receiving and decompressing the forensic marked illegal content;
analyzing a histogram of an image of the decompressed content and generating a watermark pattern by using the analysis result;
receiving the decompressed content and the watermark pattern;
calculating a correlation value and determining watermark bit information to output a message bit; and
repeatedly decoding the output message bit and performing an ECC decoding on the repeatedly decoded message bit to extract a forensic mark.

16. The method of claim 9, further comprising transforming the content to match a display method of the content utilization apparatus.

* * * * *